United States Patent
Itsui

(10) Patent No.: US 10,748,528 B2
(45) Date of Patent: Aug. 18, 2020

(54) LANGUAGE MODEL GENERATING DEVICE, LANGUAGE MODEL GENERATING METHOD, AND RECORDING MEDIUM

(71) Applicant: Mitsubishi Electric Corporation, Tokyo (JP)

(72) Inventor: Hiroyasu Itsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 155 days.

(21) Appl. No.: 15/765,620

(22) PCT Filed: Oct. 9, 2015

(86) PCT No.: PCT/JP2015/078749
§ 371 (c)(1),
(2) Date: Apr. 3, 2018

(87) PCT Pub. No.: WO2017/061027
PCT Pub. Date: Apr. 13, 2017

(65) Prior Publication Data
US 2019/0080688 A1 Mar. 14, 2019

(51) Int. Cl.
*G10L 15/197* (2013.01)
*G10L 15/06* (2013.01)
(Continued)

(52) U.S. Cl.
CPC .......... *G10L 15/197* (2013.01); *G06F 40/20* (2020.01); *G06F 40/247* (2020.01);
(Continued)

(58) Field of Classification Search
CPC .......... G06F 17/2755; G06F 17/2795; G06F 17/2765; G10L 15/197
See application file for complete search history.

(56) References Cited

U.S. PATENT DOCUMENTS 7,693,829 B1 * 4/2010 Alshawi ............. G06F 16/9032
707/999.003
7,937,265 B1 * 5/2011 Pasca .................. G06F 17/2775
704/1
(Continued)

FOREIGN PATENT DOCUMENTS

JP 2002-82690 A 3/2002
JP 2004-133003 A 4/2004
(Continued)

OTHER PUBLICATIONS

Liu, Xunying, Mark JF Gales, and Philip C. Woodland. "Paraphrastic language models." Computer Speech & Language 28.6 (2014): 1298-1316. (Year: 2014).*
(Continued)

*Primary Examiner* — Brian L Albertalli
(74) *Attorney, Agent, or Firm* — Birch, Stewart, Kolasch & Birch, LLP

(57) ABSTRACT

A language model generating device according to the present invention includes: a paraphrase generating unit to generate, by using morphemes of a phrase included in learning example sentences that include a plurality of sentences and using synonyms for original expressions of the morphemes, a plurality of paraphrases that include a combination of an original expression of a morpheme and a synonym for an original expression of a morpheme and a combination of synonyms for original expressions of morphemes; and a language model generating unit to generate a language model that is based on an n-gram model from the plurality of paraphrases generated and the learning example sentences.

6 Claims, 14 Drawing Sheets

(51) Int. Cl.
  *G06F 40/20* (2020.01)
  *G06F 40/247* (2020.01)
  *G06F 40/268* (2020.01)
  *G10L 15/02* (2006.01)

(52) U.S. Cl.
  CPC ............ *G06F 40/268* (2020.01); *G10L 15/02* (2013.01); *G10L 15/06* (2013.01)

(56) References Cited

U.S. PATENT DOCUMENTS

| | | | |
|---|---|---|---|
| 9,262,402 B2* | 2/2016 | Tateishi | G06F 17/2795 |
| 2006/0106595 A1* | 5/2006 | Brockett | G06F 17/2785 |
| | | | 704/9 |
| 2008/0040339 A1* | 2/2008 | Zhou | G06F 16/3334 |
| 2011/0161072 A1 | 6/2011 | Terao et al. | |
| 2012/0041756 A1* | 2/2012 | Hanazawa | G10L 15/02 |
| | | | 704/9 |
| 2013/0103390 A1* | 4/2013 | Fujita | G06F 17/2765 |
| | | | 704/9 |
| 2016/0140958 A1* | 5/2016 | Heo | G06F 17/2785 |
| | | | 704/9 |

FOREIGN PATENT DOCUMENTS

| | | |
|---|---|---|
| JP | 2011-164175 A | 8/2011 |
| WO | WO 2010/021368 A1 | 2/2010 |

OTHER PUBLICATIONS

Fujita, Atsushi, and Satoshi Sato. "Measuring the appropriateness of automatically generated phrasal paraphrases." Information and Media Technologies 5.1 (2010): 258-294. (Year: 2010).*

Khosmood, Foaad, and Robert Levinson. "Combining Corpus-Based Features for Selecting Best Natural Language Sentences." 2011 10th International Conference on Machine Learning and Applications and Workshops. vol. 2. IEEE, 2011. (Year: 2011).*

Inui, "Techniques to Paraphrase a Language Expression," Proceedings of the 8th Annual Meeting of the Association for Natural Language Processing Tutorial Shiryo, Mar. 17, 2002, pp. 1-21, (72 pages), with English translation.

Kita et al., "Probabilistic Language Model," Chapter 3 N-GRAM Model, University of Tokyo Press, Nov. 25, 1999, pp. 57-99 (79 pages total), with partial translation.

Nagao, "Natural Language Processing," Iwanami Shoten, Apr. 26, 1996, pp. 118-137 (42 pages total), with partial translation.

Okamoto et al., "Evaluation of Spontaneous Speech Recognition Using Statistical Language Model with Example Sentences," The Acoustical Society of Japan Autumn I, Sep. 26, 2002, pp. 189-190 (14 pages total), with English translation.

Shikano et al., "Speech Recognition System," Chapter 4 Statistical Language Model, Ohmsha, Ltd., May 15, 2001, pp. 1-53 (85 pages total), with partial translation.

* cited by examiner

| ORIGINAL EXPRESSION | SYNONYMS |
|---|---|
| ... | ... |
| II (GOOD) | SUBARASHII (GREAT), TADASHII (CORRECT), KAWAII (CUTE) |
| ... | ... |
| OTO (SOUND) | ONCHOU (INTONATION), KOE (VOICE) |
| ... | ... |
| KIKU (HEAR, COMBINATION OF KANJI AND HIRAGANA) | KIKU (LISTEN, ANOTHER COMBINATION OF KANJI AND HIRAGANA), SASHIDASU (GIVE) |
| ... | ... |

FIG.9

NI HON NO SUPĪKĀ DE II OTO DE KIKU KOTO GA DEKIRU KAGIRARETA BASHO GA SONZAI ... (THERE IS A LIMITED PLACE WHERE YOU CAN HEAR GOOD QUALITY SOUND WITH TWO SPEAKERS ...)

KOGATA SUPĪKĀ DE KONNANI KANTANNI II OTO DE KIKU KOTO MO DEKIRU N DA TO KANGEKI ... (IMPRESSED BY HOW EASILY YOU CAN HEAR GOOD QUALITY SOUND WITH A SMALL SPEAKER ...)

SUPĪKĀ DE II OTO DE KIKU TAME NI ŌDIO WO SOROERU NO MO II GA ... (IT IS GOOD TO BUY AUDIO INSTRUMENTS IN ORDER TO LISTEN TO GOOD QUALITY SOUND WITH SPEAKERS, BUT ...)

KONO II OTO DE KIKU TAME NI HA IROIRO NA JOUKEN GA ARI MASU GA SUPĪKĀ NI ... (THERE ARE VARIOUS CONDITIONS FOR ENABLING YOU TO LISTEN TO GOOD QUALITY SOUND LIKE THIS, BUT SPEAKERS ...)

| PARAPHRASE SENTENCE | LIKELIHOOD INFORMATION | | |
|---|---|---|---|
| | COVERAGE (%) | PP | LIKELI-HOOD |
| SUPĪKĀ DE II OTO DE KIKU TAME NI ŌDIO WO SOROERU NO MO II GA ... (IT IS GOOD TO BUY AUDIO INSTRUMENTS IN ORDER TO LISTEN TO GOOD QUALITY SOUND WITH SPEAKERS, BUT ...) | 100.0 | 108.7 | 2.04 |
| KONO II OTO DE KIKU TAME NI HA IROIRO NA JOUKEN GA ARI MASU GA SUPĪKĀ NI ... (THERE ARE VARIOUS CONDITIONS FOR ENABLING YOU TO LISTEN TO GOOD QUALITY SOUND LIKE THIS, BUT SPEAKERS ...) | 100.0 | 128.2 | 2.11 |
| | | | |

FIG.12
508

| AVERAGE LIKELIHOOD | PARAPHRASE |
|---|---|
| 2.11 | SUBARASHII (KANJI+HIRAGANA) OTO DE KIKU (LISTEN) (LISTEN TO GREAT QUALITY SOUND) |
| 2.25 | II OTO DE KIKU (LISTEN) (LISTEN TO GOOD QUALITY SOUND) |
| 2.32 | YOI (HIRAGANA) OTO DE KIKU (HEAR) (HEAR GOOD QUALITY SOUND) |
| 2.38 | YOI (KANJI+HIRAGANA) OTO DE KIKU (LISTEN) (LISTEN TO GOOD QUALITY SOUND) |
| 2.40 | YOI (KANJI+HIRAGANA) ONSHITSU DE KIKU (LISTEN) (LISTEN TO SOUND OF GOOD QUALITY) |
| 2.50 | YOI (KANJI+HIRAGANA) NEIRO DE KIKU (LISTEN) (LISTEN TO GOOD SOUND) |
| 2.67 | SUBARASHII (HIRAGANA) ONKYOU DE KIKU (HEAR) (HEAR IN GREAT ACOUSTIC CONDITIONS) |
| 2.67 | SUGURETA ONSHITSU DE KIKU (LISTEN) (LISTEN TO SOUND OF EXCELLENT QUALITY) |
| 2.68 | KAWAII (KANJI+HIRAGANA) KOE DE SHITSUMON (ASK IN CUTE VOICE) |
| 2.70 | KAWAII (HIRAGANA) KOE DE KIKU (HEAR) (HEAR IN CUTE VOICE) |
| 2.73 | YOI (HIRAGANA) OTO DE KIKU (LISTEN) (LISTEN TO GOOD QUALITY SOUND) |
| 2.76 | KAWAII (HIRAGANA) KOE DE KIKU (LISTEN) (LISTEN TO CUTE VOICE) |
| 2.78 | II KOE DE KIKU (HEAR) (HEAR IN PLEASANT VOICE) |
| 2.84 | YOI (KANJI+HIRAGANA) HIBIKI DE ATAERU (ADD GOOD RESONANCE) |
| 2.89 | KAWAII (KANJI+HIRAGANA) KOE DE KIKU (HEAR) (HEAR IN CUTE VOICE) |
| 3.12 | YOI (HIRAGANA) HIBIKI DE KIKU (HEAR) (HEAR IN RESONANT VOICE) |

FIG.13
509

| AVERAGE LIKELIHOOD | PARAPHRASE |
|---|---|
| 2.11 | SUBARASHII (KANJI+HIRAGANA) OTO DE KIKU (LISTEN) (LISTEN TO GREAT QUALITY SOUND) |
| 2.25 | II OTO DE KIKU (LISTEN) (LISTEN TO GOOD QUALITY SOUND) |
| 2.32 | YOI (HIRAGANA) OTO DE KIKU (LISTEN) (LISTEN TO GOOD QUALITY SOUND) |
| 2.38 | YOI (KANJI+HIRAGANA) OTO DE KIKU (LISTEN) (LISTEN TO GOOD QUALITY SOUND) |
| 2.40 | YOI (KANJI+HIRAGANA) ONSHITSU DE KIKU (LISTEN) (LISTEN TO SOUND OF GOOD QUALITY) |
| 2.50 | YOI (KANJI+HIRAGANA) NEIRO DE KIKU (LISTEN) (LISTEN TO GOOD SOUND) |
| 2.67 | SUBARASHII (HIRAGANA) ONKYOU DE KIKU (HEAR) (HEAR IN GREAT ACOUSTIC CONDITIONS) |
| 2.67 | SUGURETA ONSHITSU DE KIKU (LISTEN) (LISTEN TO SOUND OF EXCELLENT QUALITY) |

| EXPRESSION |
|---|
| ... |
| II (GOOD), YOI (GOOD, HIRAGANA), YOI (GOOD, COMBINATION OF KANJI AND HIRAGANA) |
| ... |
| KAWAII (CUTE, HIRAGANA), KAWAII (CUTE, COMBINATION OF KANJI AND HIRAGANA) |
| ... |

| AVERAGE LIKELIHOOD | PARAPHRASE |
|---|---|
| 2.11 | SUBARASHII (KANJI+HIRAGANA) OTO DE KIKU (LISTEN) (LISTEN TO GREAT QUALITY SOUND) |
| 2.35 | II OTO DE KIKU (LISTEN) (LISTEN TO GOOD QUALITY SOUND) |
| 2.40 | YOI (KANJI+HIRAGANA) ONSHITSU DE KIKU (LISTEN) (LISTEN TO SOUND OF GOOD QUALITY) |
| 2.50 | YOI (KANJI+HIRAGANA) NEIRO DE KIKU (LISTEN) (LISTEN TO GOOD SOUND) |
| 2.51 | YOI (HIRAGANA) OTO DE KIKU (HEAR) (HEAR GOOD QUALITY SOUND) |
| 2.67 | SUBARASHII (HIRAGANA) ONKYOU DE KIKU (HEAR) (HEAR IN GREAT ACOUSTIC CONDITIONS) |
| 2.67 | SUGURETA ONSHITSU DE KIKU (LISTEN) (LISTEN TO SOUND OF EXCELLENT QUALITY) |
| 2.68 | KAWAII (KANJI+HIRAGANA) KOE DE SHITSUMON (ASK IN CUTE VOICE) |
| 2.78 | II KOE DE KIKU (HEAR) (HEAR IN PLEASANT VOICE) |
| 2.80 | KAWAII (HIRAGANA) KOE DE KIKU (HEAR) (HEAR IN CUTE VOICE) |
| 2.84 | YOI (KANJI+HIRAGANA) HIBIKI DE ATAERU (ADD GOOD RESONANCE) |
| 3.12 | YOI (HIRAGANA) HIBIKI DE KIKU (HEAR) (HEAR IN RESONANT VOICE) |

FIG.21

| AVERAGE LIKELIHOOD | PARAPHRASE |
|---|---|
| 2.11 | SUBARASHII (KANJI+HIRAGANA) OTO DE KIKU (LISTEN)<br>(LISTEN TO GREAT QUALITY SOUND) |
| 2.35 | II OTO DE KIKU (LISTEN)<br>(LISTEN TO GOOD QUALITY SOUND) |
| 2.40 | YOI (KANJI+HIRAGANA) ONSHITSU DE KIKU (LISTEN)<br>(LISTEN TO SOUND OF GOOD QUALITY) |
| 2.50 | YOI (KANJI+HIRAGANA) NEIRO DE KIKU (LISTEN)<br>(LISTEN TO GOOD SOUND) |
| 2.51 | YOI (HIRAGANA) OTO DE KIKU (HEAR)<br>(HEAR GOOD QUALITY SOUND) |
| 2.67 | SUBARASHII (HIRAGANA) ONKYOU DE KIKU (HEAR)<br>(HEAR IN GREAT ACOUSTIC CONDITIONS) |
| 2.67 | SUGURETA ONSHITSU DE KIKU (LISTEN)<br>(LISTEN TO SOUND OF EXCELLENT QUALITY) |

FIG.22

ONGAKU WO II OTO DE KIKU NI HA SUPĪKĀ GA JUUYOU
(IF YOU WANT TO LISTEN TO GOOD QUALITY SOUND WHEN
PLAYING MUSIC, SPEAKERS ARE IMPORTANT)

FIG.23

KONO SUPĪKĀ DE II OTO DE KIKU KOTO GA DEKIRU
(THIS SPEAKER ENABLES YOU TO HEAR GOOD QUALITY SOUND)

FIG.24

| EXPRES-SION | PRONUN-CIATION | ORIGINAL FORM | PART OF SPEECH |
|---|---|---|---|
| ONGAKU (KANJI) | ONGAKU | ONGAKU (KANJI) | NOUN-GENERAL |
| WO | WO | WO | POSTPOSITION-CASE MARKER-GENERAL |
| II | II | II | ADJECTIVE-INDEPENDENT |
| OTO (KANJI) | OTO | OTO (KANJI) | NOUN-GENERAL |
| DE | DE | DE | POSTPOSITION-CASE MARKER-GENERAL |
| KIKU (KANJI+ HIRAGANA) | KIKU | KIKU (KANJI+ HIRAGANA) | VERB-INDEPENDENT |
| NI | NI | NI | POSTPOSITION-CASE MARKER-GENERAL |
| HA | HA | HA | POSTPOSITION-BINDING PARTICLE |
| SUPĪKĀ | SUPĪKĀ | SUPĪKĀ | NOUN-GENERAL |
| GA | GA | GA | POSTPOSITION-CASE MARKER-GENERAL |
| JUUYOU (KANJI) | JUUYOU | JUUYOU (KANJI) | NOUN-ADJECTIVAL NOUN STEM |
| EOS | | | |

FIG.25

<s> ONGAKU (KANJI)+ONGAKU+NOUN-GENERAL WO+WO+POSTPOSITION-CASE MARKER-GENERAL II+II+ADJECTIVE-INDEPENDENT OTO (KANJI)+OTO+NOUN-GENERAL DE+DE+POSTPOSITION-CASE MARKER-GENERAL KIKU (KANJI+HIRAGANA)+KIKU+VERB-INDEPENDENT NI+NI+POSTPOSITION-CASE MARKER-GENERAL HA+HA+POSTPOSITION-BINDING PARTICLE SUPĪKĀ+SUPĪKĀ+NOUN-GENERAL GA+GA+POSTPOSITION-CASE MARKER-GENERAL JUUYOU (KANJI)+JUUYOU+NOUN-ADJECTIVAL NOUN STEM <s>

FIG.27

```
Good-Turing discounting was applied.
1-gram frequency of frequency : 11
2-gram frequency of frequency : 11 0 0 0 0 0 0
3-gram frequency of frequency : 11 0 0 0 0 0 0
1-gram discounting ratios : 0.85
2-gram discounting ratios :
3-gram discounting ratios :

\data\
ngram 1=13
ngram 2=11
ngram 3=11

\1-grams :
-1.1139 <UNK> 0.0000
-1.1139 <s>      -0.4424
-1.1139 II+II+ADJECTIVE-INDEPENDENT                        -0.4424
-1.1139 GA+GA+POSTPOSITION-CASE MARKER-GENERAL             -0.4424
-1.1139 DE+DE+POSTPOSITION-CASE MARKER-GENERAL             -0.4424
-1.1139 NI+NI+POSTPOSITION-CASE MARKER-GENERAL             -0.4424
-1.1139 HA+HA+POSTPOSITION-BINDING PARTICLE      -0.4424
-1.1139 WO+WO+POSTPOSITION-CASE MARKER-GENERAL             -0.4424
-1.1139 SUPĪKĀ+SUPĪKĀ+NOUN-GENERAL                         -0.4424
-1.1139 KIKU (KANJI+HIRAGANA)+KIKU+VERB-INDEPENDENT    -0.4424
-1.1139 JUUYOU (KANJI)+JUUYOU+NOUN-ADJECTIVAL NOUN STEM    0.0000
-1.1139 OTO (KANJI)+OTO+NOUN-GENERAL     -0.4424
-1.1139 ONGAKU (KANJI)+ONGAKU+NOUN-GENERAL                 -0.4424

\2-grams :
-0.1761 <s> ONGAKU (KANJI)+ONGAKU+NOUN-GENERAL 0.1761
-0.1761 II+II+ADJECTIVE-INDEPENDENT  OTO (KANJI)+OTO+NOUN-GENERAL 0.1761
-0.1761 GA+GA+POSTPOSITION-CASE MARKER-GENERAL  JUUYOU (KANJI)+JUUYOU+NOUN-
ADJECTIVAL NOUN STEM -0.2663
-0.1761 DE+DE+POSTPOSITION-CASE MARKER-GENERAL  KIKU (KANJI+HIRAGANA)+KIKU+VERB-
INDEPENDENT 0.1761
-0.1761 NI+NI+POSTPOSITION-CASE MARKER-GENERAL  HA+HA+POSTPOSITION-
BINDING PARTICLE 0.1761
-0.1761 HA+HA+POSTPOSITION-BINDING PARTICLE  SUPĪKĀ+SUPĪKĀ+NOUN-GENERAL 0.1761
-0.1761 WO+WO+POSTPOSITION-CASE MARKER-GENERAL  II+II+ADJECTIVE-INDEPENDENT 0.1761
-0.1761 SUPĪKĀ+SUPĪKĀ+NOUN-GENERAL  GA+GA+POSTPOSITION-CASE MARKER-GENERAL 0.1761
-0.1761 KIKU (KANJI+HIRAGANA)+KIKU+VERB-INDEPENDENT  NI+NI+POSTPOSITION-CASE MARKER-
GENERAL 0.1761
-0.1761 OTO (KANJI)+OTO+NOUN-GENERAL  DE+DE+POSTPOSITION-CASE MARKER-GENERAL 0.1761
-0.1761 ONGAKU (KANJI)+ONGAKU+NOUN-GENERAL  WO+WO+POSTPOSITION-CASE MARKER-
GENERAL 0.1761

\3-grams :
-0.3010 <s> ONGAKU (KANJI)+ONGAKU+NOUN-GENERAL  WO+WO+POSTPOSITION-CASE MARKER-
GENERAL
-0.3010 II+II+ADJECTIVE-INDEPENDENT  OTO (KANJI)+OTO+NOUN-GENERAL  DE+DE+POSTPOSITION-
CASE MARKER-GENERAL
-0.3010 GA+GA+POSTPOSITION-CASE MARKER-GENERAL  JUUYOU (KANJI)+JUUYOU+NOUN-
ADJECTIVAL NOUN STEM  <s>
-0.3010 DE+DE+POSTPOSITION-CASE MARKER-GENERAL  KIKU (KANJI+HIRAGANA)+KIKU+VERB-
INDEPENDENT  NI+NI+POSTPOSITION-CASE MARKER-GENERAL
-0.3010 NI+NI+POSTPOSITION-CASE MARKER-GENERAL  HA+HA+POSTPOSITION-BINDING PARTICLE
SUPĪKĀ+SUPĪKĀ+NOUN-GENERAL
-0.3010 HA+HA+POSTPOSITION-BINDING PARTICLE  SUPĪKĀ+SUPĪKĀ+NOUN-GENERAL
GA+GA+POSTPOSITION-CASE MARKER-GENERAL
-0.3010 WO+WO+POSTPOSITION-CASE MARKER-GENERAL  II+II+ADJECTIVE-INDEPENDENT
OTO (KANJI)+OTO+NOUN-GENERAL
-0.3010 SUPĪKĀ+SUPĪKĀ+NOUN-GENERAL  GA+GA+POSTPOSITION-CASE MARKER-GENERAL
JUUYOU (KANJI)+JUUYOU+NOUN-ADJECTIVAL NOUN STEM
-0.3010 KIKU (KANJI+HIRAGANA)+KIKU+VERB-INDEPENDENT  NI+NI+POSTPOSITION-CASE MARKER-
GENERAL  HA+HA+POSTPOSITION-BINDING PARTICLE
-0.3010 OTO (KANJI)+OTO+NOUN-GENERAL  DE+DE+POSTPOSITION-CASE MARKER-GENERAL
KIKU (KANJI+HIRAGANA)+KIKU+VERB-INDEPENDENT
-0.3010 ONGAKU (KANJI)+ONGAKU+NOUN-GENERAL  WO+WO+POSTPOSITION-CASE MARKER-
GENERAL  II+II+ADJECTIVE-INDEPENDENT \end\
```

<s> KONO+KONO+ADNOMINAL ADJECTIVE SUPĪKĀ+SUPĪKĀ+NOUN-GENERAL DE+DE+AUXILIARY VERB II+II+VERB-INDEPENDENT OTO (KANJI)+OTO+NOUN-GENERAL DE+DE+POSTPOSITION-CASE MARKER-GENERAL KIKU (KANJI+HIRAGANA)+KIKU+VERB-INDEPENDENT KOTO (KANJI)+KOTO+NOUN-DEPENDENT-GENERAL GA+GA+POSTPOSITION-CASE MARKER-GENERAL DEKIRU+DEKIRU+VERB-INDEPENDENT <s>

Sevallm -arpa ORIGINAL SENTENCE.arpa perplexity -text PARAPHRASE SENTENCE.text -annotate PARAPHRASE SENTENCE.anno
Computing perplexity of the language model with respect
  to the text eval4_1_cha.cmu
Annotation will be written to file eval4_1_cha.anno
Perplexity = 9.07, Entropy = 3.18 bits
Computation based on 6 words.
Number of 3-grams hit = 0 (0.00%)
Number of 2-grams hit = 1 (16.67%)
Number of 1-grams hit = 5 (83.33%)
6 OOVs (50.00%) and 0 context cues were removed from the calculation.

P( <s> | ) = 0.0769308 logprob = -1.113900 bo_case = 1
P( SUPĪKĀ+SUPĪKĀ+NOUN-GENERAL | <s> <UNK> ) = 0.0769308 logprob = -1.113900 bo_case = 3x2x1
P( OTO (KANJI)+OTO+NOUN-GENERAL | <UNK> <UNK> ) = 0.0769308 logprob = -1.113900 bo_case = 3x2x1
P( DE+DE+POSTPOSITION-CASE MARKER-GENERAL | <UNK> OTO (KANJI)+OTO+NOUN-GENERAL ) = 0.666653 logprob = -0.176100 bo_case = 3x2
P( GA+GA+POSTPOSITION-CASE MARKER-GENERAL | <UNK> <UNK> ) = 0.0769308 logprob = -1.113900 bo_case = 3x2x1
P( <s> | GA+GA+POSTPOSITION-CASE MARKER-GENERAL | <UNK> ) = 0.0769308 logprob = -1.113900 bo_case = 3x2x1

LANGUAGE MODEL GENERATING DEVICE, LANGUAGE MODEL GENERATING METHOD, AND RECORDING MEDIUM

FIELD

The present invention relates to a technique of generating a language model using not only learning example sentences but also n-grams learned from synonymous phrases (paraphrases) for phrases included in the example sentences.

BACKGROUND

Techniques of converting speech to text by speech recognition are useful in many fields such as making transcripts in the medical and legal fields and creating broadcast captions. Speech-to-text conversion can facilitate database searching.

For example, telephone conversations in a call center are converted to text so as to associate speech with text, and the text is subjected to a string search, whereby speech associated with the text can be easily found. This enables customer names, item numbers, and the like included in telephone conversations to be used as keywords for search refinement, so that monitoring can be performed with pinpoint accuracy. However, speech recognition results sometimes include misrecognition, causing a reduction in search accuracy. How to reduce misrecognition is an issue to be addressed.

A typical existing speech recognition technique uses an acoustic model that associates features of speech with phonemes and a language model that represents the relation between a sequence of words. The methods of using n-gram models described in Non Patent Literatures 1 to 3 are attracting attention as the usage of language models for accurate speech recognition. An n-gram model is a probabilistic language model generated through learning from learning example sentences and used for predicting the next word from previous (n−1) words.

The problem of n-gram models is that a sequence of words that does not exist in learning example sentences has an appearance probability of zero, which is called a sparseness problem. A typical solution to this problem is to use smoothing (refer to Non Patent Literature 2 below).

CITATION LIST

Non Patent Literature

Non Patent Literature 1: Kiyohiro Shikano, Katsunobu Itou, Tatsuya Kawahara, Kazuya Takeda, Mikio Yamamoto, "Speech Recognition System", Ohmsha, Ltd., May 15, 2001, pp. 53-155

Non Patent Literature 2: Kenji Kita, Junichi Tsujii, "Probabilistic Language Model", University of Tokyo Press, Nov. 25, 1999, pp. 57-99

Non Patent Literature 3: Makoto Nagao, "Natural Language Processing", Iwanami Shoten, Apr. 26, 1996, pp. 118-137

SUMMARY

Technical Problem

However, smoothing also has a problem: since the probability of a value smaller than the current n-value is used for prediction, a sequence of words that can never occur in practice is included in the language model, and the risk of misrecognition is increased.

The present invention has been made in order to solve the above-mentioned problems, and an object thereof is to obtain a language model generating device that generates a language model that reduces speech misrecognition of a sequence of words that does not exist in learning example sentences.

Solution to Problem

A language model generating device according to an aspect of the present invention includes: a paraphrase generating unit to generate, by using morphemes of a phrase included in learning example sentences that include a plurality of sentences and using synonyms for original expressions of the morphemes, a plurality of paraphrases that include a combination of an original expression of a morpheme and a synonym for an original expression of a morpheme and a combination of synonyms for original expressions of morphemes; and a language model generating unit to generate a language model that is based on an n-gram model from the plurality of paraphrases generated and the learning example sentences.

A language model generating method according to an aspect of the present invention includes: a paraphrase generating step of generating, by using morphemes of a phrase included in learning example sentences that include a plurality of sentences and using synonyms for original expressions of the morphemes, a plurality of paraphrases that include a combination of an original expression of a morpheme and a synonym for an original expression of a morpheme and a combination of synonyms for original expressions of morphemes; and a language model generating step of generating a language model that is based on an n-gram model from the plurality of paraphrases generated and the learning example sentences.

A language model generating program according to an aspect of the present invention causes a computer to execute: a paraphrase generating step of generating, by using morphemes of a phrase included in learning example sentences that include a plurality of sentences and using synonyms for original expressions of the morphemes, a plurality of paraphrases that include a combination of an original expression of a morpheme and a synonym for an original expression of a morpheme and a combination of synonyms for original expressions of morphemes; and a language model generating step of generating a language model that is based on an n-gram model from the plurality of paraphrases generated and the learning example sentences.

A speech recognition device according to an aspect of the present invention includes: a language model storage unit to store a language model that is based on an n-gram model, the language model being generated, by using morphemes of a phrase included in learning example sentences that include a plurality of sentences and using synonyms for original expressions of the morphemes, from a plurality of paraphrases that include a combination of an original expression of a morpheme and a synonym for an original expression of a morpheme and a combination of synonyms for original expressions of morphemes and from the learning example sentences; an acoustic model storage unit to store an acoustic model that includes a pattern of feature of speech; a speech input unit to receive input of a speech signal; and a speech recognition unit to recognize the speech signal using the language model and the acoustic model and output a speech recognition result.

A speech recognizing method according to an aspect of the present invention includes: a language model storing step of storing a language model that is based on an n-gram model, the language model being generated, by using morphemes of a phrase included in learning example sentences that include a plurality of sentences and using synonyms for original expressions of the morphemes, from a plurality of paraphrases that include a combination of an original expression of a morpheme and a synonym for an original expression of a morpheme and a combination of synonyms for original expressions of morphemes and from the learning example sentences; an acoustic model storing step of storing an acoustic model that includes a pattern of feature of speech; a speech input step of receiving input of a speech signal; and a speech recognizing step of recognizing the speech signal using the language model and the acoustic model and output a speech recognition result.

A speech recognizing program according to an aspect of the present invention causes a computer to execute: a language model storing step of storing a language model that is based on an n-gram model, the language model being generated, by using morphemes of a phrase included in learning example sentences that include a plurality of sentences and using synonyms for original expressions of the morphemes, from a plurality of paraphrases that include a combination of an original expression of a morpheme and a synonym for an original expression of a morpheme and a combination of synonyms for original expressions of morphemes; an acoustic model storing step of storing an acoustic model that includes a pattern of feature of speech; a speech input step of receiving input of a speech signal; and a speech recognition step of recognizing the speech signal using the language model and the acoustic model and output a speech recognition result.

Advantageous Effects of Invention

According to the present invention, since a language model is generated using not only learning example sentences but also n-grams learned from paraphrases, i.e., synonymous phrases for phrases included in the examples sentences, it is possible to obtain a language model that reduces speech misrecognition of a sequence of words that does not exist in the learning example sentences.

BRIEF DESCRIPTION OF DRAWINGS

FIG. 9 is a diagram illustrating original sentences according to the first embodiment.

FIG. 10 is a diagram illustrating paraphrase sentences according to the first embodiment.

FIG. 11 is a diagram illustrating likelihood information on the paraphrase sentences according to the first embodiment.

FIG. 12 is a diagram illustrating a list of paraphrases and the average likelihoods thereof according to the first embodiment.

FIG. 13 is a diagram illustrating a list of paraphrases having average likelihoods smaller than a threshold value according to the first embodiment.

FIG. 19 is a diagram illustrating exemplary data stored in a different expression storage unit according to the second embodiment.

FIG. 20 is a diagram illustrating a list of paraphrases obtained by unifying paraphrases expressed in different terms and the average likelihoods thereof according to the second embodiment.

FIG. 21 is a diagram illustrating a list of paraphrases having average likelihoods smaller than a threshold value according to the second embodiment.

FIG. 22 is a diagram illustrating an original sentence according to a third embodiment.

FIG. 23 is a diagram illustrating a paraphrase sentence according to the third embodiment.

FIG. 24 is a diagram illustrating a morphological analysis result obtained through the morphological analysis of the original sentence according to the third embodiment.

FIG. 25 is a diagram illustrating an original.text file obtained through the conversion of the morphological analysis result according to the third embodiment.

FIG. 27 is a diagram illustrating an original.arpa file as an exemplary n-gram language model according to the third embodiment.

FIG. 28 is a diagram illustrating a morphological analysis result obtained through the morphological analysis of the paraphrase sentence according to the third embodiment.

FIG. 29 is a diagram illustrating a result of calculating PP and coverage according to the third embodiment.

FIG. 30 is a diagram illustrating a paraphrase sentence.anno file according to the third embodiment.

DESCRIPTION OF EMBODIMENTS

First Embodiment

Figures 1, 2:
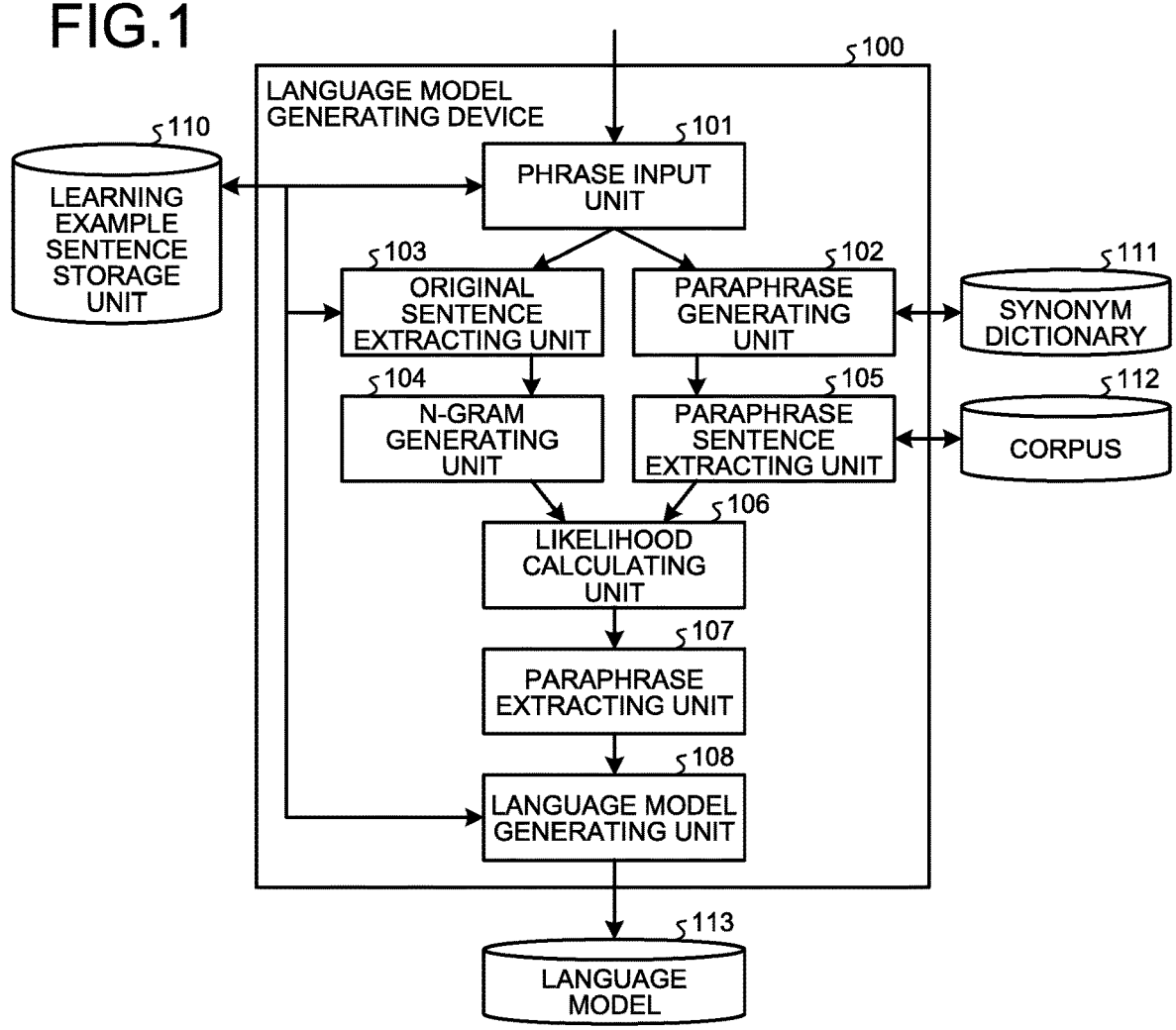
FIG. 1 is a block diagram illustrating a configuration of a language model generating device according to a first embodiment.
FIG. 2 is a diagram illustrating exemplary data of a synonym dictionary according to the first embodiment.

FIG. 1 is a block diagram illustrating a configuration of a language model generating device 100 according to a first embodiment. The language model generating device 100 includes a phrase input unit 101, a paraphrase generating unit 102, an original sentence extracting unit 103, an n-gram generating unit 104, a paraphrase sentence extracting unit 105, a likelihood calculating unit 106, a paraphrase extracting unit 107, and a language model generating unit 108. The language model generating device 100 uses input from a learning example sentence storage unit 110, a synonym dictionary 111, and a corpus 112 to output a language model 113.

The learning example sentence storage unit 110 is a storage unit that stores learning example sentences for use in generating a language model. Example sentences in the field targeted for speech recognition are used as the learning example sentences. Assuming that the present embodiment is applied to the recognition of conversations exchanged in a call center where operators respond to inquiries about home appliances, and all the sentences contained in instruction manuals for home appliances are used as the learning example sentences. The instruction manuals describe methods of operating and setting home appliances using Japanese sentences such as "ii oto de kiku ni ha, saraundo modo ni site . . . (in order to hear good quality sound, use the surround mode . . . )", for example. The instruction manuals are incorporated in a language model as the learning example sentences, whereby the rate of recognition of the sequences of words described in the instruction manuals can be improved.

The synonym dictionary 111 is data of a dictionary containing synonyms.

FIG. 2 is a diagram illustrating exemplary data of the synonym dictionary 111 according to the first embodiment. Synonyms are indicated in association with original expressions. Synonyms for "ii (good)" include "subarashii (great)", "tadashii (correct)", and "kawaii (cute)". Synonyms for "oto (sound)" include "onchou (intonation)" and "koe (voice)". Synonyms for "kiku (hear, "kiku" here is written in a combination of kanji and hiragana)" include "kiku (listen, "kiku" here is written in another combination of kanji and hiragana)" and "sashidasu (give)".

The corpus 112 is a huge amount of data including a collection of natural language texts. The corpus 112 is a tagged corpus in which each sentence of the texts is segmented into morphemes and information about the part of speech is added to each of the morphemes.

The phrase input unit 101 sequentially reads phrases from the learning example sentences stored in the learning example sentence storage unit 110 in response to an instruction from a user, and outputs the read phrases to the paraphrase generating unit 102 and the original sentence extracting unit 103.

The paraphrase generating unit 102 refers to the synonym dictionary 111 to generate paraphrases, i.e., synonymous phrases for the phrases input from the phrase input unit 101, and outputs the generated paraphrases to the paraphrase sentence extracting unit 105.

The original sentence extracting unit 103 refers to the learning example sentence storage unit 110 to extract all the sentences that include the phrases input from the phrase input unit 101, and outputs the extracted sentences as original sentences to the n-gram generating unit 104.

The n-gram generating unit 104 learns from the original sentences to generate n-grams, and outputs the generated n-grams to the likelihood calculating unit 106.

The paraphrase sentence extracting unit 105 refers to the corpus 112 to extract, from the corpus 112, sentences that include the paraphrases input from the paraphrase generating unit 102, and outputs the extracted sentences as paraphrase sentences to the likelihood calculating unit 106.

From the n-grams input from the n-gram generating unit 104 and the paraphrase sentences input from the paraphrase sentence extracting unit 105, the likelihood calculating unit 106 calculates likelihood indicating whether each paraphrase sentence is similar in context to the original sentences, and outputs the paraphrase sentences and the likelihoods thereof to the paraphrase extracting unit 107.

The paraphrase extracting unit 107 extracts, from the paraphrase sentences input from the likelihood calculating unit 106, paraphrase sentences having likelihoods equal to or smaller than a threshold value, and outputs the extracted paraphrase sentences to the language model generating unit 108. In the present embodiment, smaller likelihoods indicate a higher degree of similarity in context to the original sentences.

The language model generating unit 108 learns the n-grams using the paraphrases input from the paraphrase extracting unit 107 and the learning example sentences stored in the learning example sentence storage unit 110, generates the language model 113, and outputs the generated language model 113.

Next, operational details will be described. Suppose that the Japanese phrase read by the phrase input unit 101 from the learning example sentence storage unit 110 is "ii oto de kiku (hear good quality sound)".

Figure 3:
FIG. 3 is a diagram illustrating a Japanese phrase "ii oto de kiku (hear good quality sound)" included in learning example sentences according to the first embodiment.

FIG. 3 is a diagram illustrating a phrase 501 "ii oto de kiku (hear good quality sound)" included in the learning example sentences according to the first embodiment.

First, the operation of the paraphrase generating unit 102 will be described using FIGS. 4 to 7.

Figure 4:
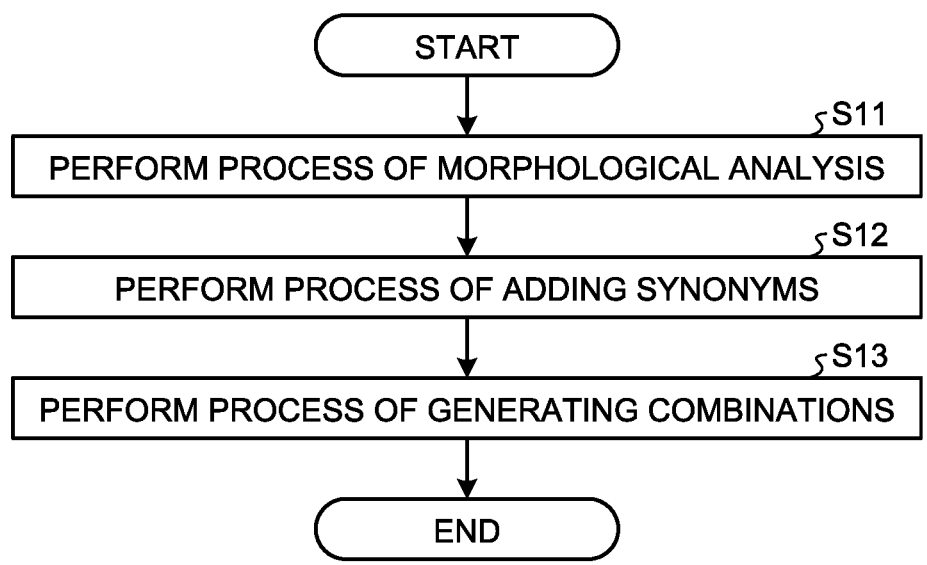
FIG. 4 is a flowchart illustrating the processing procedure performed by a paraphrase generating unit according to the first embodiment.

FIG. 4 is a flowchart illustrating the processing procedure performed by the paraphrase generating unit 102 according to the first embodiment.

Figure 5:
FIG. 5 is a diagram illustrating a string of morphemes according to the first embodiment.

FIG. 5 is a diagram illustrating a string of morphemes 502 according to the first embodiment. The sign "/" indicates a boundary between morphemes.

Figure 6:
FIG. 6 is a diagram illustrating a string of morphemes with synonyms according to the first embodiment.

FIG. 6 is a diagram illustrating a string of morphemes 503 with synonyms according to the first embodiment. The sign "," indicates a boundary between synonyms, and the signs "[" and "]" respectively indicate the beginning and end of a list representing a string of synonyms.

Figure 7:
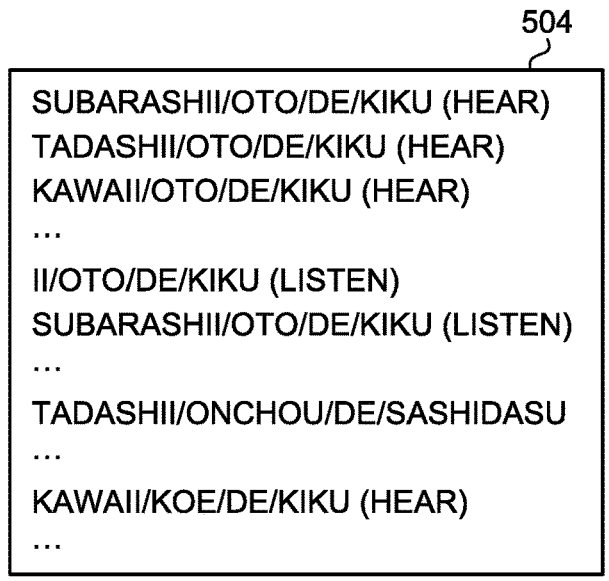
FIG. 7 is a diagram illustrating paraphrases according to the first embodiment.

FIG. 7 is a diagram illustrating paraphrases 504 according to the first embodiment.

The paraphrase generating unit 102 morphologically analyzes the phrase "ii oto de kiku (hear good quality sound)" input from the phrase input unit 101. Morphological analysis is the process of segmenting an input phrase into morphemes. Morpheme is a minimum meaningful unit. The phrase "ii oto de kiku (hear good quality sound)" is morphologically analyzed and segmented into the string of morphemes 502 "ii/oto/de/kiku". The string of morphemes 502 is illustrated in FIG. 5 (step Si i of FIG. 4).

Next, the paraphrase generating unit 102 refers to the synonym dictionary 111 to search for synonyms for all the morphemes except the postposition.

The paraphrase generating unit 102 searches the synonym dictionary 111 for synonyms for the original expression "ii (good)", which is the first morpheme in the string of morphemes 502, and reads "subarashii (great), tadashii (correct), kawaii (cute)". The paraphrase generating unit 102 generates the list of "[ii, subarashii, tadashii, kawaii]" by adding the synonyms to the original expression, and replaces the first morpheme "ii" in the string of morphemes 502 with the list. Next, the paraphrase generating unit 102 searches the synonym dictionary 111 for synonyms for the second morpheme "oto (sound)" in the string of morphemes 502, and reads "onchou (intonation), koe (voice)". The paraphrase generating unit 102 generates the list of "[oto, onchou, koe]" by adding the synonyms to the original expression, and replaces the second morpheme "oto" in the string of morphemes 502 with the list.

Since the third morpheme "de" in the string of morphemes 502 is a postposition, the paraphrase generating unit 102 performs no operation. Next, the paraphrase generating unit 102 searches the synonym dictionary 111 for synonyms for the fourth morpheme "kiku (hear)" in the string of morphemes 502, and reads "kiku (listen), sashidasu (give)". The paraphrase generating unit 102 generates the list of "[kiku (hear), kiku (listen), sashidasu]" by adding the synonyms to the original expression, and replaces the fourth morpheme "kiku (hear)" in the string of morphemes 502 with the list. In this manner, the paraphrase generating unit 102 generates the string of morphemes 503 "[ii, subarashii, tadashii, kawaii]/[oto, onchou, koe]/de/[kiku (hear), kiku (listen), sashidasu]" by adding the synonyms to the string of morphemes 502. The string of morphemes 503 with the synonyms is illustrated in FIG. 6 (step S12 of FIG. 4).

Next, the paraphrase generating unit 102 generates the paraphrases 504 by combining morphemes from the string of morphemes 503 with the synonyms, and outputs the paraphrases 504 to the paraphrase extracting unit 107. However, the combination consisting of only the original expressions of the respective morphemes is not included in the paraphrases 504. The number of words for "ii (good)" including its synonyms is four, the number of words for "oto (sound)" including its synonyms is three, and the number of words for "kiku (hear)" including its synonyms is three. Thus, the paraphrases 504 for the phrase "ii oto de kiku (hear good quality sound)" include 35 (4 ×3 ×3 −1) combinations. The paraphrases 504 are produced by replacing one or more of the plurality of morphemes of the phrase 501 with synonyms for the original expressions. The paraphrases 504 for the phrase "ii oto de kiku (hear good quality sound)" are illustrated in FIG. 7 (step S13 of FIG. 4).

Next, the operation of the original sentence extracting unit 103, the n-gram generating unit 104, the paraphrase sentence extracting unit 105, the likelihood calculating unit 106, and the paraphrase extracting unit 107 will be described using FIGS. 8 to 12.

Figure 8:
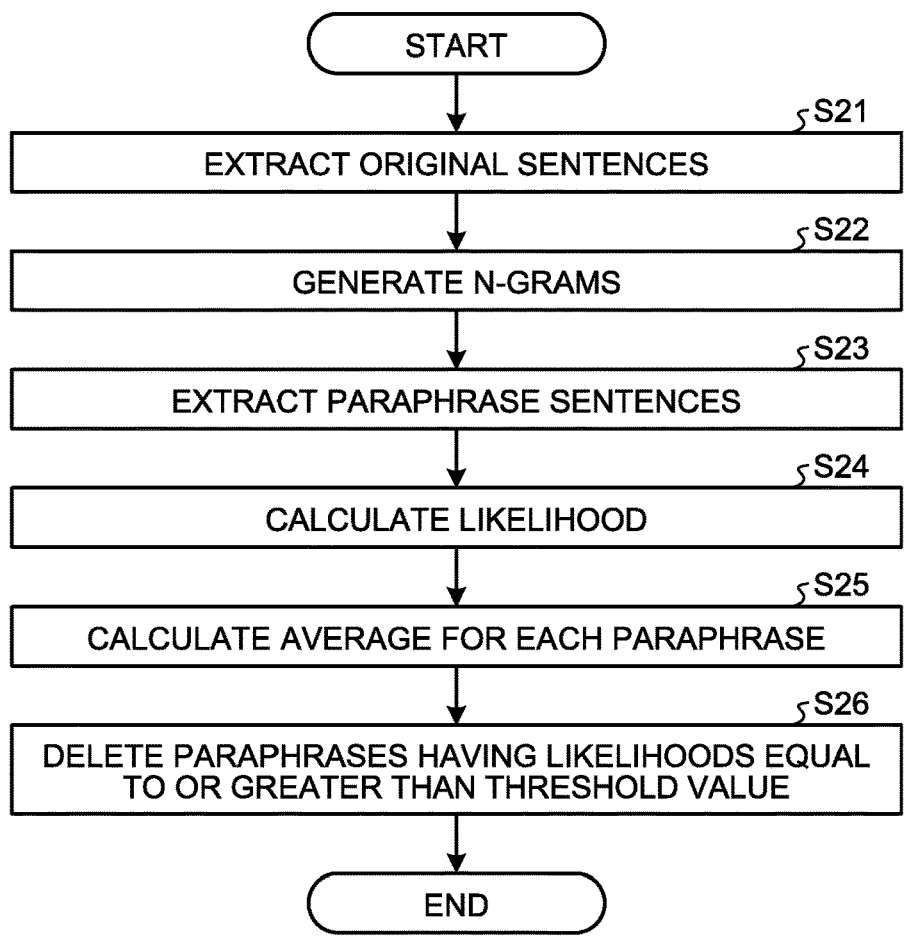
FIG. 8 is a flowchart illustrating the processing procedure performed by an original sentence extracting unit, an n-gram generating unit, a paraphrase sentence extracting unit, a likelihood calculating unit, and a paraphrase extracting unit according to the first embodiment.

FIG. 8 is a flowchart illustrating the processing procedure performed by the original sentence extracting unit 103, the n-gram generating unit 104, the paraphrase sentence extracting unit 105, the likelihood calculating unit 106, and the paraphrase extracting unit 107 according to the first embodiment.

FIG. 9 is a diagram illustrating original sentences 505 according to the first embodiment.

FIG. 10 is a diagram illustrating paraphrase sentences 506 according to the first embodiment.

FIG. 11 is a diagram illustrating likelihood information on the paraphrase sentences 506 according to the first embodiment.

FIG. 12 is a diagram illustrating a list 508 of the paraphrases 504 and the average likelihoods thereof according to the first embodiment.

The original sentence extracting unit 103 refers to the learning example sentences stored in the learning example sentence storage unit 110 to extract all the sentences that include the phrase 501 "ii oto de kiku (hear good quality sound)" from the learning example sentences. In the present embodiment, these extracted sentences are referred to as original sentences. The original sentence extracting unit 103 outputs the original sentences to the n-gram generating unit 104. The original sentences 505, which include the phrase "ii oto de kiku (hear good quality sound)", are illustrated in FIG. 9 (step S21 of FIG. 8).

Next, the n-gram generating unit 104 generates an n-gram language model on the basis of the original sentences input from the original sentence extracting unit 103, and outputs the n-gram language model to the likelihood calculating unit 106. The process of generating an n-gram language model can be performed simply by applying a well-known method. For example, the n-gram generating unit 104 generates an n-gram language model using the method described in pp. 53-65 of Non Patent Literature 1 (step S22 of FIG. 8).

Next, the paraphrase sentence extracting unit 105 refers to the corpus 112 to extract all the sentences that include any of the paraphrases 504 input from the paraphrase generating unit 102. The paraphrase sentence extracting unit 105 outputs the extracted sentences as paraphrase sentences to the likelihood calculating unit 106. The paraphrase sentences 506, which include the paraphrase "ii oto de kiku (listen to good quality sound)" are illustrated in FIG. 10 as exemplary paraphrase sentences (step S23 of FIG. 8).

Next, the likelihood calculating unit 106 calculates word test set perplexity (hereinafter referred to as PP) and coverage (word coverage in the present embodiment) using the n-gram language model input from the n-gram generating unit 104 and the paraphrase sentences 506 input from the paraphrase sentence extracting unit 105. PP is a measure for evaluating a language model, and is defined as the inverse of the geometric mean of the appearance probability of a word. A language model with a low PP has a high ability to distinguish sentences that need to be recognized from sentences that do not need to be recognized. Coverage is a value indicating to what extent a language model covers sequences of words. PP and coverage are calculated with a well-known method using the n-gram language model and the paraphrase sentences 506. The method of calculating PP and coverage will be described in detail in a third embodiment.

The likelihood calculating unit 106 calculates likelihood L with Mathematical Formula (1) using PP and coverage C. In this formula, "α" represents an unknown word correction constant, which is four in the present embodiment.

[Formula 1]

$$L = C \cdot \log(PP) + (1-C) \cdot \alpha \qquad \text{Mathematical Formula (1)}$$

Likelihood information on the paraphrase sentences 506 is illustrated in FIG. 11. The Japanese sentence "Supīkā de ii oto de kiku tame ni odio wo soroeru no mo ii ga . . . (It is good to buy audio instruments in order to listen to good quality sound with speakers, but . . . )" has a coverage of 100.0%, a PP of 108.7, and a likelihood of 2.04. The Japanese sentence "Kono ii oto de kiku tame ni ha iroiro na jouken ga ari masu ga supīkā ni . . . (There are various conditions for enabling you to listen to good quality sound like this, but speakers . . . )" has a coverage of 100.0%, a PP of 128.2, and a likelihood of 2.11. Likelihood is a value obtained by correcting the cross entropy of each of the paraphrase sentences 506 with respect to the original sentences with the coverage. Likelihood represents how close in context each of the paraphrase sentences 506 is to all the original sentences 505 (step S24 of FIG. 8).

Next, the likelihood calculating unit 106 calculates average likelihood for each of the paraphrases 504. Average likelihood μ is calculated with Mathematical Formula (2). In this formula, "n" represents the number of identical paraphrases and "Tn" represents the likelihood of the identical paraphrases.

[Formula 2]

$$\mu = \frac{1}{n}\sum_{i=1}^{n} T_i \qquad \text{Mathematical Formula (2)}$$

The likelihood calculating unit 106 outputs the list 508 of the paraphrases 504 and the average likelihoods thereof to the paraphrase extracting unit 107. The list 508 of the paraphrases 504 and the average likelihoods thereof is illustrated in FIG. 12 (step S25 of FIG. 8).

Next, the paraphrase extracting unit 107 extracts, from the paraphrases 504, paraphrases that have average likelihoods smaller than a threshold value. The present embodiment is based on the assumption that the paraphrase extracting unit 107 holds a threshold value of 2.68 in advance. Since lower likelihoods indicate lower cross entropies and higher degree of similarity in context, paraphrases with lower likelihoods are more likely to have a similar meaning to that of the original sentences.

FIG. 13 is a diagram illustrating a list 509 of paraphrases that have average likelihoods smaller than the threshold value according to the first embodiment.

The paraphrase extracting unit 107 outputs, to the language model generating unit 108, the list 509 of paraphrases that have average likelihoods smaller than the threshold value (step S26 of FIG. 8).

The language model generating unit 108 generates a language model that is based on the n-gram model using the paraphrases input from the paraphrase extracting unit 107 and the learning example sentences stored in the learning example sentence storage unit 110, and outputs the language model. For example, the method described in pp. 53-65 of Non Patent Literature 1 is used for generating a language model.

Next, a hardware configuration of the language model generating device according to the present embodiment will be described.

Figure 14:
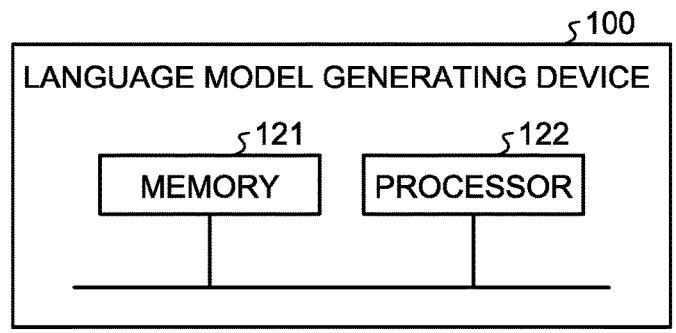
FIG. 14 is a block diagram illustrating a hardware configuration of the language model generating device according to the first embodiment.

FIG. 14 is a block diagram illustrating a hardware configuration of the language model generating device 100 according to the first embodiment. The language model generating device 100 includes a memory 121 and a processor 122.

The memory 121 stores programs and data for implementing the functions of the phrase input unit 101, the paraphrase generating unit 102, the original sentence extracting unit 103, the n-gram generating unit 104, the paraphrase sentence extracting unit 105, the likelihood calculating unit 106, the paraphrase extracting unit 107, and the language model generating unit 108. The memory 121 includes, for example, a read only memory (ROM), a random access memory (RAM), a hard disk drive (HDD), and a solid state drive (SSD).

The processor 122 reads the programs and data stored in the memory 121 to implement the functions of the phrase input unit 101, the paraphrase generating unit 102, the original sentence extracting unit 103, the n-gram generating unit 104, the paraphrase sentence extracting unit 105, the likelihood calculating unit 106, the paraphrase extracting unit 107, and the language model generating unit 108. The processor 122 is implemented by a processing circuit such as a CPU and a system large scale integration (LSI) that executes the programs stored in the memory 121.

Alternatively, a plurality of processing circuits may be configured to cooperate with each other to execute the functions of the phrase input unit 101, the paraphrase generating unit 102, the original sentence extracting unit 103, the n-gram generating unit 104, the paraphrase sentence extracting unit 105, the likelihood calculating unit 106, the paraphrase extracting unit 107, and the language model generating unit 108. Still alternatively, the functions of the phrase input unit 101, the paraphrase generating unit 102, the original sentence extracting unit 103, the n-gram generating unit 104, the paraphrase sentence extracting unit 105, the likelihood calculating unit 106, the paraphrase extracting unit 107, and the language model generating unit 108 may be implemented as hardware by a processing circuit that includes the memory 121 and the processor 122.

Next, a speech recognition device that utilizes the language model 113 generated in this manner will be described.

Figure 15:
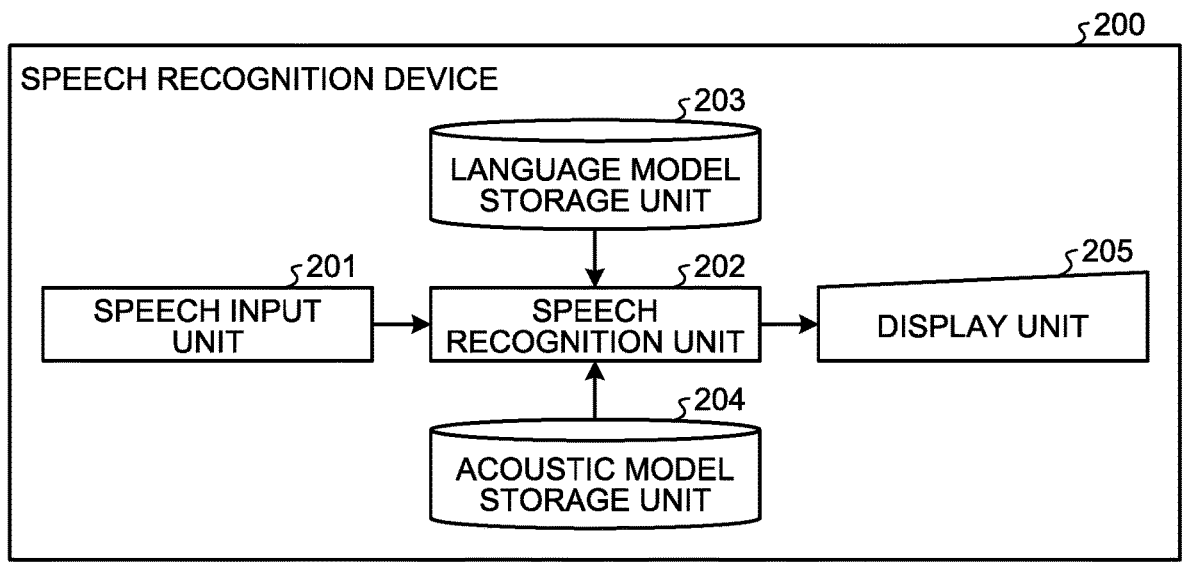
FIG. 15 is a block diagram illustrating a configuration of a speech recognition device that uses a language model generated by the language model generating device according to the first embodiment.

FIG. 15 is a block diagram illustrating a configuration of a speech recognition device 200 that uses the language model 113 generated by the language model generating device 100 according to the first embodiment. The speech recognition device 200 includes a speech input unit 201, a speech recognition unit 202, a language model storage unit 203, an acoustic model storage unit 204, and a display unit 205.

The speech input unit 201 converts a user's voice to a digital speech signal that can be digitally processed. The digital speech signal output from the speech input unit 201 is input to the speech recognition unit 202.

The language model storage unit 203 stores the language model 113 output from the above-mentioned language model generating device 100.

The acoustic model storage unit 204 stores, on a per-phonemic basis, an acoustic model that includes patterns of standard features of speech. The acoustic model is compared with the features of input speech in a speech recognition process and used for recognizing the input speech on a per-phonemic basis.

The speech recognition unit 202 refers to the acoustic model stored in the acoustic model storage unit 204 and the language model 113 stored in the language model storage unit 203 to perform speech recognition on the input digital speech signal. The speech recognition unit 202 outputs, to the display unit 205, a series of words having the maximum likelihood as the result of the speech recognition.

The display unit 205 displays the series of words input from the speech recognition unit 202.

Next, a hardware configuration of the speech recognition device 200 according to the present embodiment will be described.

Figure 16:
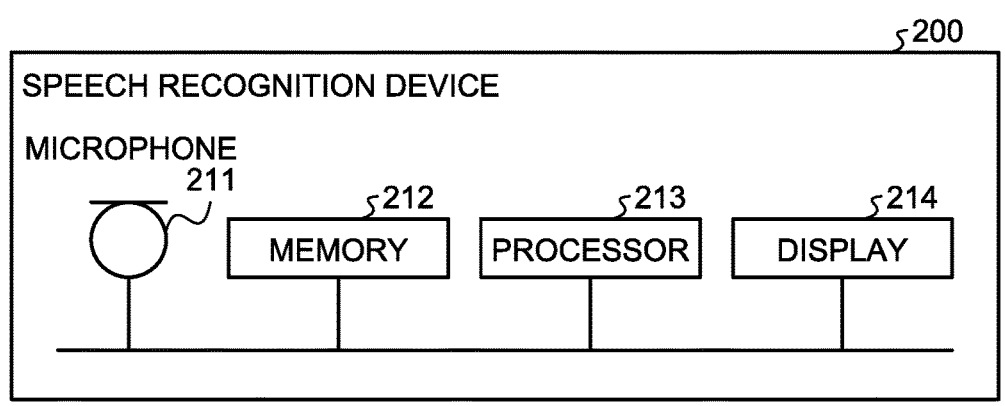
FIG. 16 is a block diagram illustrating a hardware configuration of the speech recognition device that uses a language model generated by the language model generating device according to the first embodiment.

FIG. 16 is a block diagram illustrating a hardware configuration of the speech recognition device 200 that uses the language model 113 generated by the language model generating device 100 according to the first embodiment. The speech recognition device 200 includes a microphone 211, a memory 212, a processor 213, and a display 214.

The microphone 211 implements the function of the speech input unit 201.

The memory 212 stores programs and data for implementing the functions of the speech recognition unit 202, the language model storage unit 203, and the acoustic model storage unit 204. The memory 212 includes, for example, a read only memory (ROM), a random access memory (RAM), a hard disk drive (HDD), and a solid state drive (SSD).

The processor 213 reads the programs and data stored in the memory 212 to realize each function of the speech recognition unit 202. The processor 213 is implemented by a processing circuit such as a CPU and a system large scale integration (LSI) that executes the programs stored in the memory 212.

Alternatively, a plurality of processing circuits may be configured to cooperate with each other to execute the functions of the speech recognition unit 202.

The display 214 implements the function of the display unit 205.

Since different users may express the Japanese phrase "ii oto de kiku (hear good quality sound)" in different terms having similar meanings such as "subarashii oto de kiku (hear great quality sound)" and "sugureta onshitsu de kiku (listen to sound of excellent quality)", the speech recognition unit 202 cannot recognize some expressions only by using the sentences in the instruction manuals for home appliances as the learning example sentences. In the present embodiment, however, the speech recognition unit 202 can recognize a wider range of expressions.

The process of extracting paraphrases described in the present embodiment is based on the exemplary phrase "ii oto de kiku (hear good quality sound)". In practice, the language model generating device 100 reads all the phrases from the learning example sentences stored in the learning example sentence storage unit 110, extracts paraphrases similar in context to the original sentences for all the phrases, and generates a language model from the learning example sentences and the extracted paraphrases. However, much computational effort is required to process all the phrases in the learning example sentences. Thus, for example, a language model may be generated by performing the processes according to the present embodiment only on the phrases used in the titles of chapters and sections of the instruction manuals. The effect of reducing speech misrecognition can still be obtained in this manner.

In the present embodiment, the paraphrase extracting unit 107 extracts, using likelihood, paraphrases similar in context to the original sentences from the paraphrases 504 generated in the paraphrase generating unit 102. Alternatively, a language model may be created from the paraphrases generated in the paraphrase generating unit 102 and the learning example sentences.

Figure 17:
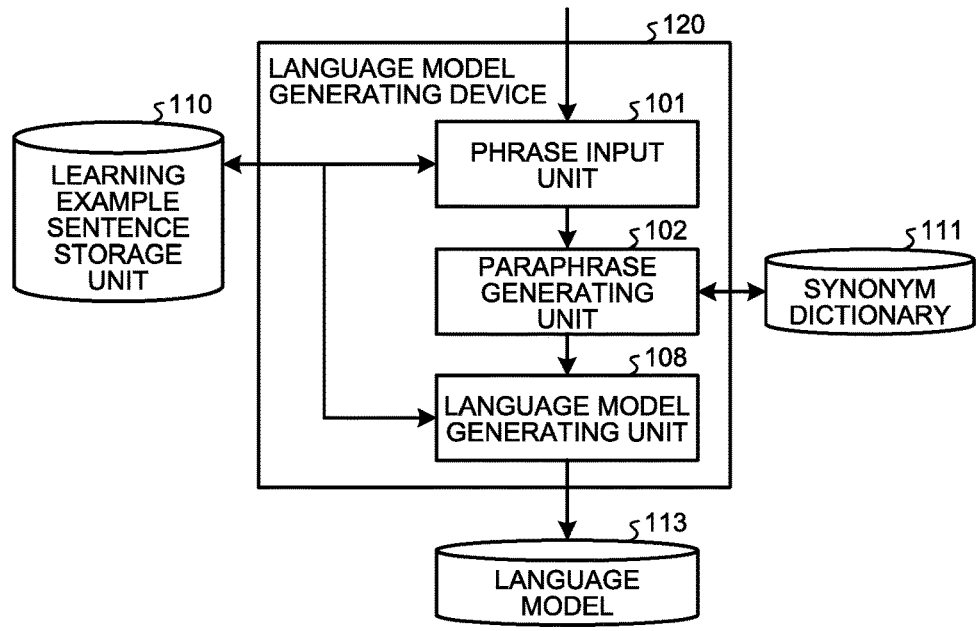
FIG. 17 is a block diagram illustrating a configuration of a language model generating device according to the first embodiment.

FIG. 17 is a block diagram illustrating a configuration of a language model generating device 120 according to the first embodiment. The paraphrase generating unit 102 refers to the synonym dictionary 111 to generate the paraphrases 504, i.e., synonymous phrases for the phrases input from the phrase input unit 101, and outputs the generated paraphrases 504 to the language model generating unit 108. The language model generating unit 108 generates an n-gram model using the paraphrases 504 input from the paraphrase generating unit 102 and the learning example sentences stored in the learning example sentence storage unit 110, and outputs the generated n-gram model as a language model. Since the language model generating device 120 generates an n-gram model from the paraphrases 504 and the learning example sentences, the language model generating device 120 can generate a language model that reduces speech misrecognition of a sequence of words that does not exist in the learning example sentences.

Since the language model generating device 100 generates a language model from some paraphrases similar in context to the original sentences and the learning example sentences, the language model generated by the language model generating device 100 can reduce the amount of processing in the language model generating unit 108 and further reduce misrecognition in comparison with the language model generated by the language model generating device 120.

Therefore, in the present embodiment, since a language model is generated using not only learning example sentences but also n-grams learned from paraphrases similar in context to the original sentences, the generated language model can reduce speech misrecognition of a sequence of words that does not exist in the learning example sentences. The speech recognition device 200 can reduce misrecognition by performing speech recognition using such a language model.

In some fields, only a limited number of learning example sentences are available. Even in such a case, in the present embodiment, since a language model is generated using not only learning example sentences but also n-grams learned from paraphrases similar in context to the original sentences, the generated language model can reduce speech misrecognition.

Second Embodiment

In the aforementioned first embodiment, average likelihood is calculated for each paraphrase. In the present embodiment, average likelihood is calculated after words expressed in different terms and included in paraphrases are unified. This brings about the effect of suppressing variations in paraphrase likelihood and estimating likelihood with a higher degree of accuracy.

Figure 18:
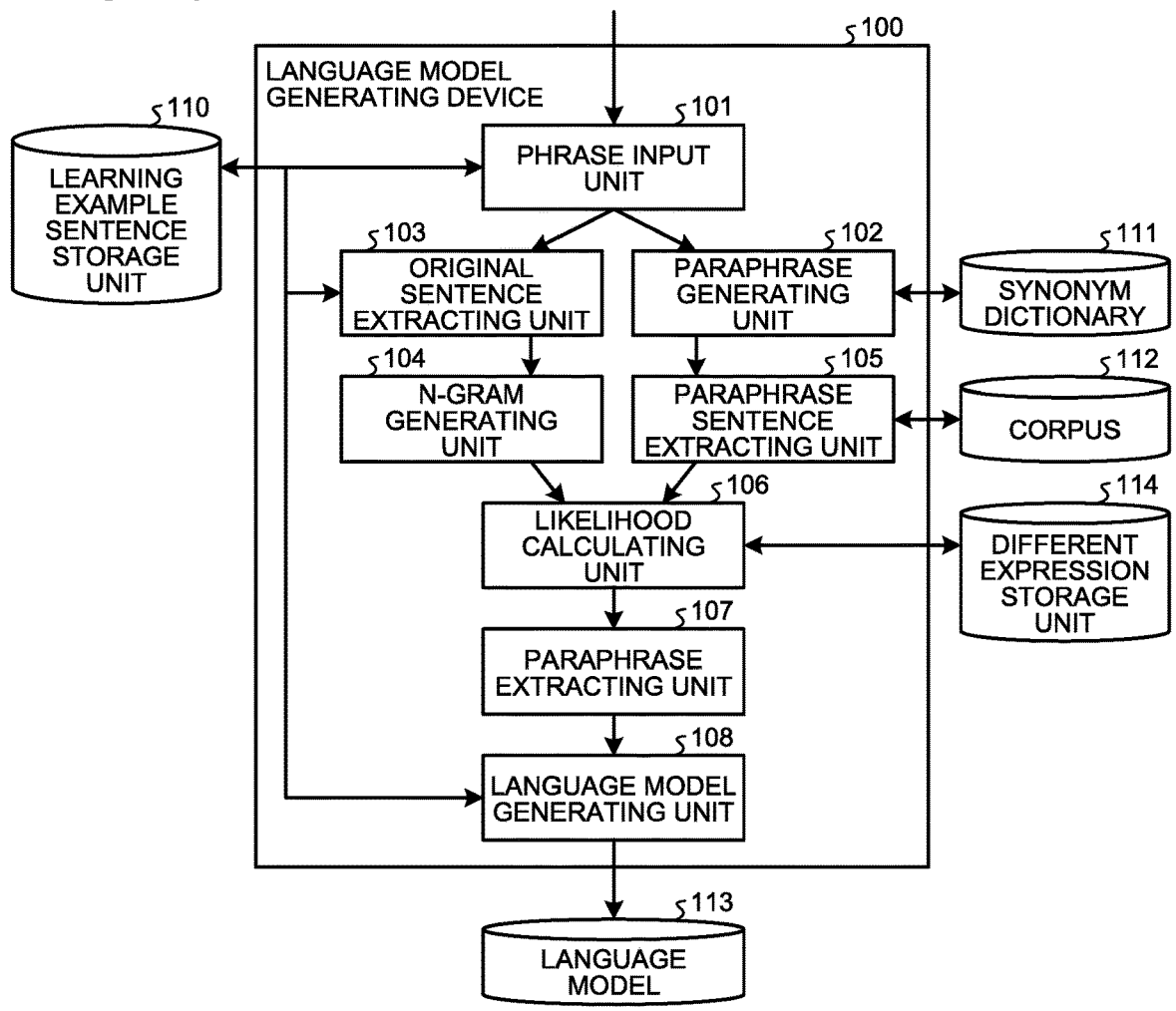
FIG. 18 is a block diagram illustrating a configuration of a language model generating device according to a second embodiment.

FIG. 18 is a block diagram illustrating a configuration of the language model generating device 100 according to the second embodiment. The only difference between the configuration of the language model generating device 100 and that in the first embodiment is that the likelihood calculating unit 106 refers to a different expression storage unit 114.

FIG. 19 is a diagram illustrating exemplary data stored in the different expression storage unit 114 according to the second embodiment. The different expression storage unit 114 stores words having the same meaning but expressed in different terms in association with each other. Both groups of words "ii (good)", "yoi (good, "yoi" here is written in hiragana)", and "yoi (good, "yoi" here is written in a combination of kanji and hiragana)" and "kawaii (cute, "kawaii" here is written in hiragana)" and "kawaii (cute, "kawaii" here is written in a combination of kanji and hiragana)" have the same meaning but expressed in different terms.

In step S25 of FIG. 8 where the likelihood calculating unit 106 calculates average likelihood for each paraphrase, the likelihood calculating unit 106 refers to the different expression storage unit 114 to calculate the arithmetic mean of all the likelihoods of paraphrases expressed in different terms and paraphrases expressed in the same term.

FIG. 20 is a diagram illustrating a list 601 of paraphrases obtained by unifying paraphrases expressed in different terms and the average likelihoods thereof according to the second embodiment. In FIG. 20, the Japanese phrases "ii oto de kiku (listen to good quality sound)", "yoi oto de kiku (listen to good quality sound, "yoi" here is written in a combination of kanji and hiragana)", and "yoi oto de kiku (listen to good quality sound, "yoi" here is written in hiragana)" illustrated in FIG. 12 in the first embodiment are unified into the phrase "ii oto de kiku (listen to good quality sound)". In addition, the Japanese phrases "kawaii koe de kiku (hear in a cute voice, "kawaii" here is written in hiragana)" and "kawaii koe de kiku (hear in a cute voice, "kawaii" here is written in a combination of kanji and hiragana)" are unified into the phrase "kawaii koe de kiku (hear in a cute voice, "kawaii" here is written in hiragana)".

The likelihood calculating unit 106 outputs, to the paraphrase extracting unit 107, the list 601 of paraphrases obtained by unifying paraphrases expressed in different terms and the average likelihoods thereof.

The paraphrase extracting unit 107 extracts, from the paraphrases, paraphrases having average likelihoods smaller than the threshold value in step S26 of FIG. 8. The threshold value is 2.68 as in the first embodiment.

FIG. 21 is a diagram illustrating a list 602 of paraphrases having average likelihoods smaller than the threshold value according to the second embodiment.

The paraphrase extracting unit 107 outputs, to the language model generating unit 108, the list 602 of paraphrases having average likelihoods smaller than the threshold value.

In the present embodiment, the different expression storage unit 114 stores in advance words having the same meaning but expressed in different terms in association with each other, and the likelihood calculating unit 106 refers to the different expression storage unit 114 to unify paraphrases expressed in different terms.

Alternatively, without providing the different expression storage unit 114, a user may issue an instruction to specify paraphrases expressed in different terms, and the likelihood calculating unit 106 may unify the paraphrases expressed in different terms in accordance with the instruction.

Therefore, in the present embodiment, since average likelihood is calculated by calculating the arithmetic mean of the likelihoods of a plurality of paraphrase sentences that include paraphrases expressed in different terms, variations in paraphrase likelihood due to expressions in different terms can be suppressed, and likelihood can be estimated with a higher degree of accuracy. In addition, since paraphrases expressed in different terms are unified, the effect of suppressing variations in language model likelihood can be achieved in speech recognition.

Third Embodiment

As described in the above-mentioned first embodiment, PP and coverage can be calculated with a well-known method using an n-gram language model and paraphrase sentences. The present embodiment describes in detail the method of calculating PP and coverage.

In the present embodiment, the method of calculating PP and coverage is described using a Japanese n-gram language model and paraphrase sentences.

The n-gram language model is generated using "CMU-Cambridge SLM Toolkit" (hereinafter referred to as a language model generating tool) described in pp. 147-155 of Non Patent Literature 1. The morphological analyzer "ChaSen" described in p. 135 of Non Patent Literature 1 is used for morphological analysis. In morphological analysis, the beginning and end of a sentence are denoted by <s>. PP and coverage are calculated with the method of evaluating a language model described in pp. 153-154 of Non Patent Literature 1.

FIG. 22 is a diagram illustrating an original sentence 701 according to the third embodiment.

FIG. 23 is a diagram illustrating a paraphrase sentence 702 according to the third embodiment.

FIG. 24 is a diagram illustrating a morphological analysis result 703 obtained through the morphological analysis of the original sentence 701 according to the third embodiment. Each row indicates a single morpheme, and the respective columns indicate the expressions, pronunciations, original forms, and parts of speech of the morphemes. "EOS" indicates the end of the sentence.

FIG. 25 is a diagram illustrating an original.text file 704 obtained through the conversion of the morphological analysis result 703 according to the third embodiment. In the original.text file 704, each morpheme is indicated by "expression+pronunciation+part of speech", and the boundary between one morpheme and the next morpheme is indicated by a space.

Figure 26:
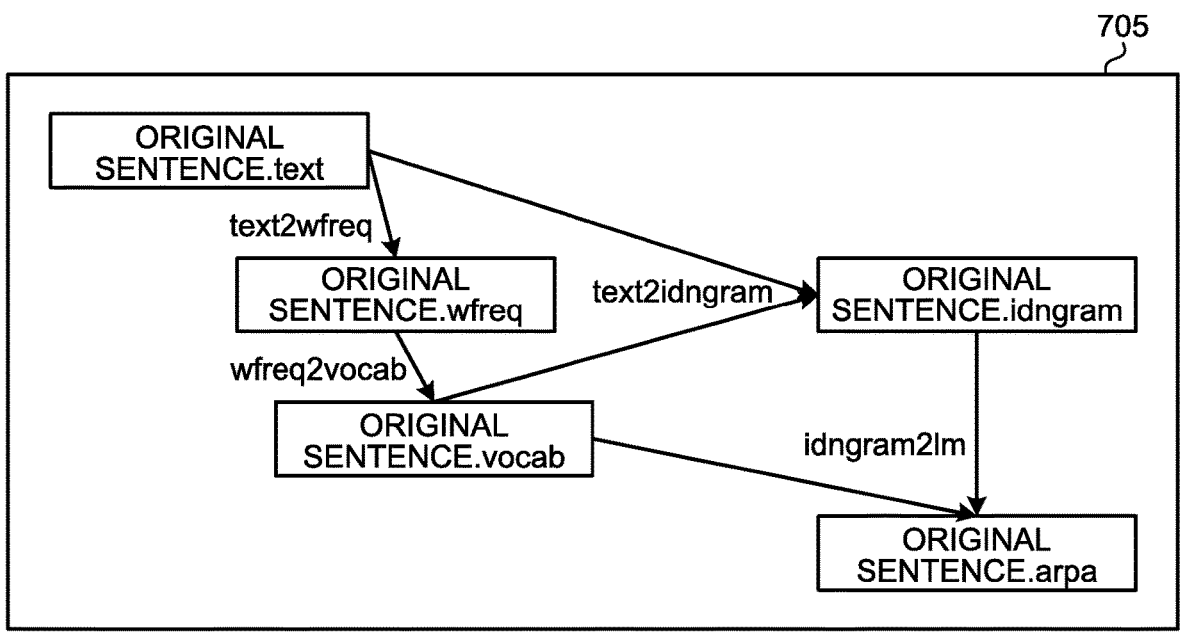
FIG. 26 is a diagram illustrating a procedure for generating a language model using a language model generating tool according to the third embodiment.

FIG. 26 is a diagram illustrating a procedure 705 for generating a language model using the language model generating tool according to the third embodiment.

FIG. 27 is a diagram illustrating an original.arpa file 706 as an exemplary n-gram language model according to the third embodiment.

FIG. 28 is a diagram illustrating a morphological analysis result 707 obtained through the morphological analysis of the paraphrase sentence 702 according to the third embodiment.

FIG. 29 is a diagram illustrating a result 708 of calculating PP and coverage according to the third embodiment.

FIG. 30 is a diagram illustrating a paraphrase sentence.anno file 709 according to the third embodiment.

The details are as follows. The original sentence 701 of FIG. 22 is used as an original sentence, and the paraphrase sentence 702 of FIG. 23 is used as a paraphrase sentence. The n-gram generating unit 104 morphologically analyzes the original sentence 701 input from the original sentence extracting unit 103 using the morphological analyzer "ChaSen" to obtain the morphological analysis result 703. Next, the n-gram generating unit 104 converts the morphological analysis result 703 to the original.text file 704. The n-gram generating unit 104 then generates the original.arpa file 706 from the original.text file 704 using the procedure for generating a language model illustrated in FIG. 26, and outputs the original.arpa file 706 as an n-gram language model to the likelihood calculating unit 106. The original.arpa file 706 illustrated in FIG. 27 indicates parameters for Good-Turing as a discounting method, the number of n-gram entries, and the log likelihood and back-off factor for each of the 1-grams, 2-grams, and 3-grams.

Furthermore, the n-gram generating unit 104 morphologically analyzes the paraphrase sentence 702 using the morphological analyzer "ChaSen" by following a procedure similar to that for the original sentence 701 to obtain the morphological analysis result 707. Next, the n-gram generating unit 104 converts the morphological analysis result 707 to a paraphrase sentence.text 707, and outputs the paraphrase sentence.text 707 to the likelihood calculating unit 106.

The likelihood calculating unit 106 calculates PP and coverage from the original.arpa file 706 and the paraphrase sentence.text 707 using the language model generating tool. The original.arpa file 706 is the n-gram language model output from the n-gram generating unit 104. The result 708 of calculating PP and coverage is illustrated in FIG. 29. With the language model generating tool, the original.arpa file is input in response to an evallm command, and the paraphrase sentence.text is subsequently input in response to a perplexity command, whereby Perplexity=9.07 and OOVs (50.00%) are obtained. "OOV" represents an unknown word rate, and the obtained result indicates a PP of 9.07 and a coverage of 50.0% (100.0-50.0). This calculation process is output as the paraphrase sentence.anno file 709.

Each row of the paraphrase sentence.anno file 709 indicates the occurrence probability of a word measurable with the n-gram language model. Out of twelve words in the paraphrase sentence.text 707, six words in six rows can be calculated, which is why the calculated coverage is 50% (6÷12×100=50). Since the number of calculatable words is six, the calculated PP is 9.0698440 (PP=(0.0769308× 0.0769308×0.0769308×0.666653×0.0769308×0.076 9308)^(−1÷6))=9.0698440), which is rounded to two decimal places and becomes 9.07. For ease of calculation, log probability "logprob" may be used.

In this manner, PP and coverage can be calculated using an original sentence and a paraphrase sentence.

Therefore, in the present embodiment, by calculating PP and coverage using an original sentence and a paraphrase sentence, the likelihood calculating unit 106 can calculate likelihood indicating whether the paraphrase sentence is similar in context to the original sentence.

REFERENCE SIGNS LIST

100, 120 language model generating device
101 phrase input unit
102 paraphrase generating unit
103 original sentence extracting unit
104 n-gram generating unit
105 paraphrase sentence extracting unit
106 likelihood calculating unit
107 paraphrase extracting unit
108 language model generating unit
110 learning example sentence storage unit
111 synonym dictionary
112 corpus
113 language model
200 speech recognition device
201 speech input unit
202 speech recognition unit
203 language model storage unit
204 acoustic model storage unit
205 display unit
121, 212 memory
122, 213 processor
211 microphone
214 display
501 phrase
502, 503 string of morphemes
504 paraphrase
505, 701 original sentence
506, 702 paraphrase sentence
507 list of likelihoods
508, 509 list of average likelihoods
703, 707 morphological analysis result
704 original.text file
705 procedure
706 original.arpa file
708 result of calculating PP and coverage
709 paraphrase sentence.anno file.

The invention claimed is:

1. A language model generating device comprising:
a paraphrase generator to generate, by using morphemes of a phrase included in learning example sentences that include a plurality of sentences and using synonyms for original expressions of the morphemes, a plurality of paraphrases that include a combination of an original expression of a morpheme and a synonym for an original expression of a morpheme and a combination of synonyms for original expressions of morphemes;
a paraphrase sentence extractor to extract and output, from a corpus that includes a plurality of sentences, a paraphrase sentence that includes any of the plurality of paraphrases;
an original sentence extractor to extract and output, from the learning example sentences, an original sentence that includes the phrase;
a likelihood calculator to calculate likelihood that indicates whether the paraphrase sentence input from the paraphrase sentence extractor is similar in context to the original sentence input from the original sentence extractor;
a paraphrase extractor to extract a paraphrase included in a paraphrase sentence whose likelihood has a value that indicates a higher degree of similarity in context to the original sentence than a threshold value; and
a language model generator to generate a language model that is based on an n-gram model from the paraphrase extracted by the paraphrase extractor and the learning example sentences.

2. The language model generating device according to claim 1, wherein
the likelihood calculator calculates average likelihood by calculating an arithmetic mean of likelihoods of a plurality of paraphrase sentences that include an identical paraphrase, and
the paraphrase extractor extracts a paraphrase included in a paraphrase sentence whose average likelihood has a value that indicates a higher degree of similarity in context to the original sentence than the threshold value.

3. The language model generating device according to claim 2, wherein
the likelihood calculator calculates average likelihood by calculating an arithmetic mean of likelihoods of a plurality of paraphrase sentences that include paraphrases expressed in different terms, and sets the average likelihood as a likelihood of a paraphrase obtained by unifying the paraphrases expressed in different terms.

4. A language, model generating method comprising:
a paraphrase generating of generating, by using morphemes of a phrase included in learning example sentences that include a plurality of sentences and using synonyms for original expressions of the morphemes, a plurality of paraphrases that include a combination of an original expression of a morpheme and a synonym for an original expression of a morpheme and a combination of synonyms for original expressions of morphemes;
a paraphrase sentence extracting of extracting and outputting, from a corpus that includes a plurality of sentences, a paraphrase sentence that includes any of the plurality of paraphrases;
an original sentence extracting of extracting and outputting, from the learning example sentences, an original sentence that includes the phrase;
a likelihood calculating of calculating likelihood that indicates whether the paraphrase sentence input in the paraphrase sentence extracting is similar in context to the original sentence input in the original sentence extracting;

a paraphrase extracting of extracting a paraphrase included in a paraphrase sentence whose likelihood has a value that indicates a higher degree of similarity in context to the original sentence than a threshold value; and a language model generating of generating a language model that is based on an n-gram model from the paraphrase extracted in the paraphrase extracting and the learning example sentences.

5. A non-transitory computer-readable recording medium that stores therein a program to cause a computer to execute:

a paraphrase generating of generating, by using morphemes of a phrase included in learning example sentences that include a plurality of sentences and using synonyms for original expressions of the morphemes, a plurality of paraphrases that include a combination of an original expression of a morpheme and a synonym for an original expression of a morpheme and a combination of synonyms for original expressions of morphemes;

a paraphrase sentence extracting of extracting and outputting, from a corpus that includes a plurality of sentences, a paraphrase sentence that includes any of the plurality of paraphrases;

an original sentence extracting of extracting and outputting, from the learning example sentences, an original sentence that includes the phrase;

a likelihood calculating of calculating likelihood that indicates whether the paraphrase sentence input in the paraphrase sentence extracting is similar in context to the original sentence input in the original sentence extracting;

a paraphrase extracting of extracting a paraphrase included in a paraphrase sentence whose likelihood has a value that indicates a higher degree of similarity in context to the original sentence than a threshold value; and a language model generating of generating a language model that is based on an n-gram model from the paraphrase extracted in the paraphrase extracting and the learning example sentences.

6. A control circuit for a language model generating device configured to perform:

a paraphrase generating of generating, by using morphemes of a phrase included in learning example sentences that include a plurality of sentences and using synonyms for original expressions of the morphemes, a plurality of paraphrases that include a combination of an original expression of a morpheme and a synonym for an original expression of a morpheme and a combination of synonyms for original expressions of morphemes;

a paraphrase sentence extracting of extracting and outputting, from a corpus that includes a plurality of sentences, a paraphrase sentence that includes any of the plurality of paraphrases;

an original sentence extracting of extracting and outputting, from the learning example sentences, an original sentence that includes the phrase;

a likelihood calculating of calculating likelihood that indicates whether the paraphrase sentence input in the paraphrase sentence extracting, is similar in context to the original sentence. input in the original sentence extracting;

a paraphrase extracting of extracting a paraphrase included in a paraphrase sentence whose likelihood has a value that indicates a higher degree of similarity in context to the original sentence than a threshold value; and a language model generating of generating a language model that is based on an n-gram model from the paraphrase extracted in the paraphrase extracting and the learning example sentences.

* * * * *